Dec. 17, 1935.                    W. R. WICKERHAM                    2,024,713
                                   SYSTEM OF CONTROL
                                  Filed Feb. 14, 1934
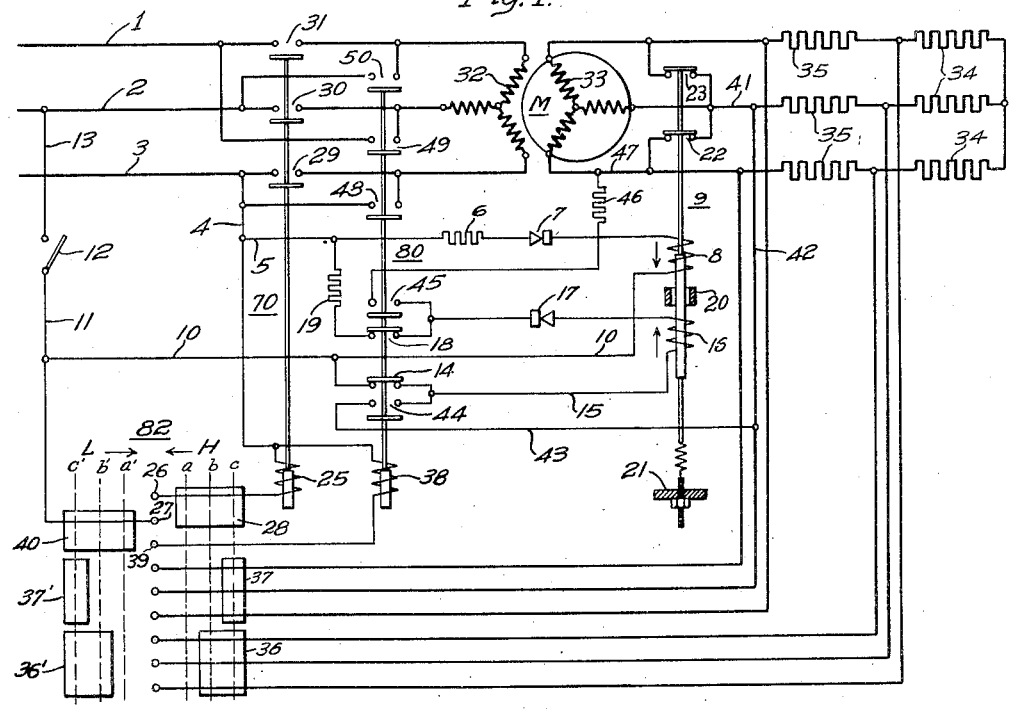
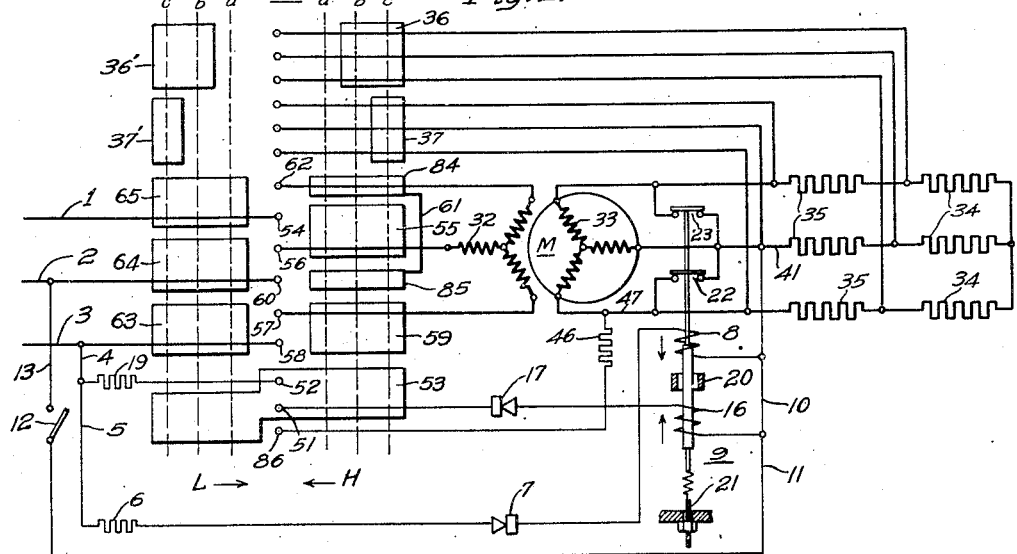
WITNESSES:                                                    INVENTOR
                                                       William R. Wickerham.
                                                              BY
                                                                 ATTORNEY Patented Dec. 17, 1935

2,024,713

UNITED STATES PATENT OFFICE 2,024,713

SYSTEM OF CONTROL

William R. Wickerham, Swissvale, Pa., assignor to Westinghouse Electric & Manufacturing Company, East Pittsburgh, Pa., a corporation of Pennsylvania Application February 14, 1934, Serial No. 711,134

13 Claims. (Cl. 172—274)

This invention relates to control systems for electric motors, particularly wound-rotor induction motors.

One object of this invention is to prevent excessive speeds of motors operating a hoist when lowering an overhauling load.

A further object of this invention is to provide for the shunting of all of the external resistor sections of a wound rotor induction motor during the lowering of an overhauling load to prevent excessive speeds.

A further and more specific object of this invention is to provide for the shunting of all of the resistor sections in the secondary of a wound rotor induction motor a predetermined interval of time after an overhauling load has attained a selected speed in the downward direction.

The devices generally found on the market at present for preventing excessive speeds in a case such as outlined above are expensive and cumbersome "load brakes". It is another object of this invention to eliminate such brake by the provision of electrical braking means having a greater efficiency than the braking means heretofore used, and in addition providing for a return of energy to the system by reason of the lowering of an overhauling load.

Other objects and advantages will become more apparent from a study of the following specification, taken in conjunction with the accompanying sheet of the drawing, in which:

Figure 1 shows a system of control utilizing magnetic reversing contactors and the novel elements embodying the present invention associated with the secondary winding of an induction motor; and Fig. 2 shows a modification of the system shown in Fig. 1, utilizing a conventional drum controller for reversing a wound-rotor induction motor.

Referring to Fig. 1, the reference character M designates a wound-rotor induction motor having the primary winding 32 and the secondary winding 33. The phase connections of the primary winding 32, with respect to three-phase supply-circuit conductors 1, 2 and 3, may be changed by the magnetic reversing contactors 70 and 80, respectively, which are in turn controlled by the manually operable controller 82. The secondary winding is provided with a plurality of resistor sections, as 34 and 35, which may also be shunted by appropriate operation of the manual controller 82.

A time-limit contactor 9 is associated with the secondary winding 33 and the resistors connected in circuit relation with this winding, whereby all of the resistor sections may be shunted when the lowering speed of an overhauling load is to be limited.

The showing in Fig. 2 is very similar to that shown in Fig. 1, except that the manually operable controller 83 is utilized to effect the reversing of the motor M.

A better understanding of the novel features of this invention and its method of operation will be obtained from a study of the sequences of operation for both a hoisting load and an overhauling lowering load.

Assuming that conductors 1, 2 and 3, constituting a source of energy, of the system shown in Fig. 1, are suitably energized and that switch 12 is closed, an energized circuit is established from line conductor 3 through conductors 4 and 5, resistor 6, rectifier 7, neutralizing coil 8 of the time-limit contactor 9, acting in the direction indicated by the full-line arrow adjacent neutralizing coil 8, conductors 10 and 11, switch 12, and conductor 13 to the conductor 2. Since a rectifier 7, which in practice may be a copper oxide rectifier, is utilized in series circuit relation with the neutralizing coil 8, the magnetizing effect of neutralizing coil 8 will always be in the direction indicated.

A further circuit is established from line conductor 2 through conductor 13, switch 12, conductors 11 and 10, back contact member 14 of the lowering magnetic contactor 80, conductor 15, magnetizing coil 16 of the time-limit contactor 9, rectifier 17, back contact members 18 of the lowering magnetic contactor 80, resistor 19 and conductors 5 and 4 to line conductor 3. Since the rectifier 17 is utilized in this circuit just traced, coil 16 will be supplied with uni-directional current whose magnetic effect is in the direction indicated by the arrow adjacent coil 16.

Coil 16 is usually designated the magnetizing coil of the time-limit contactor 9 and causes this contactor to operate to open its contact members 22 and 23, regardless of the fact that coil 8, the neutralizing coil, may be energized. The effect of coil 8 is merely to insure a complete decay of the magnetic flux in the magnetic circuit of time-limit contactor 9 when the magnetizing coil 16 becomes deenergized. If the magnetizing coil for any cause whatsoever becomes deenergized, contact members 22 and 23 will be caused to close a definite interval of time after such deenergization of magnetizing coil 16. The utility of this function will be pointed out more in detail hereinafter.

If the attendant wishes to hoist a load, he operates the drum controller 82 in the hoist direction, designated by the arrow "H", thereby establishing, in the 'a' position of the controller, a circuit from the energized conductor 4 through coil 25 of the hoisting contactor 70, contact fingers 26 and 27, bridged by the controller segment 28, to the energized conductor 11. Contact members 29, 30 and 31 of the contactor 70 are thereupon closed, energizing the primary winding 32 of the motor M.

For the 'a' position of the controller, all of the resistor sections 34 and 35 remain in circuit relation with the secondary winding 33 of the motor. The controller is thereafter moved first to the 'b' position and then to the 'c' position, thus successively shunting resistor sections 34 and 35 respectively, by the contact bridging operation of the controller segments 36 and 37, respectively.

If the hoist hook or bucket or elevator car, as the case may be, is in a position from which a load is to be lowered, the controller 82 is moved to the lowering position successively through positions 'a'', 'b'' and 'c''. If the load to be lowered is an overhauling load and of sufficient weight to produce dangerous speeds in the lowering direction in the absence of braking means, then the time-limit contactor 9 will be caused to operate to shunt the resistor sections 34 and 35, thereby making the wound-rotor inductor motor substantially equivalent to a squirrel-cage motor, whereby any speeds greater than approximately synchronous speed are prevented, as hereinafter more fully described.

For the 'a'' position of the controller 82, contact fingers 27 and 39 are bridged by the controller segment 40, thereby energizing the coil 38 of the lowering contactor 80. Contact members 48, 49 and 50 are thus closed, connecting the primary 32 to conductors 1, 2 and 3 in such a direction as to lower the load.

Operation of the contactor 80 also causes the opening of contact members 14 and 18 and the closing of contact members 44 and 45. Closing of the contact members 44 and 45 establishes a circuit from the secondary winding 33 of the motor, namely, from conductor 41 through conductors 42 and 43, contact members 44, conductor 15, magnetizing coil 16 of contactor 9, rectifier 17, contact members 45 and resistor 46 to the conductor 47. The arrangement of the contact members 14 and 18 with reference to the contact members 44 and 45 is such that contact members 14 and 18 open an instant before contact members 44 and 45 close.

It will, of course, be apparent that with coil 16 connected to the secondary winding 33, as specified, coil 16 will be energized in exactly the same manner from the secondary winding 33 so long as the load is not overhauling, thus providing a uni-directional current in coil 16. However, if the load is overhauling, the instant the motor is operated at, or near, synchronous speed, the voltage induced in the secondary winding will obviously be very small and the frequency of the current in the secondary winding drops to substantially zero, and in consequence the effect of coil 16 will be negligible. The relative effect of the neutralizing coil 8 then becomes appreciable, causing a complete decay of the magnetic flux in the magnetic circuit of contactor 9. The time-limit contactor 9, being spring-biased to the position shown, will thus close contact members 22 and 23 a definite interval of time after the energization of coil 16 has been so reduced. In other words, coil 16 becomes deenergized when the motor speed resulting from the overhauling load has attained a selected value in the lowering direction. A definite, comparatively short, interval of time after such predetermined lowering speed has been attained, the contact members 22 and 23 are closed, thus shunting all of the resistor sections out of the secondary winding 33 and, in consequence, the motor speed will not materially exceed synchronous speed.

The theory of operation of the time-limit contactor 9 is probably apparent from the foregoing discussion, but to eliminate any possible misunderstanding of the function of contactor 9, it should be noted that this contactor is provided with a non-magnetic metal ring or sleeve 20, preferably copper, about a portion of its magnetic circuit, which copper ring acts as a secondary for the coil 16 when that coil becomes deenergized, so that there may be a definite inductive time constant for the time-limit contactor 9. To further adjust and fix the time constant the adjustable spring arrangement 21 is shown.

If the load is not overhauling, time-limit contactor 9 will, of course, not close its contact members 22 and 23, and the acceleration of the motor in the lowering direction is accomplished exactly as for the hoisting direction by the successive shunting of resistor sections 34 and 35 by the controller segments 36' and 37' when the controller 82 is moved to the positions 'b'' and 'c'', respectively.

For the modification shown in Fig. 2, the operation of the time-limit contactor 9 is exactly as specified in the discussion of the embodiment shown in Fig. 1, and the acceleration in the lowering direction for a non-overhauling load is exactly as for a hoisting load.

For an overhauling load, the time-limit contactor 9 functions in the manner specified for Fig. 1. The method of operation of the reversing of the motor M is somewhat different, since controller 83 does not control magnetic contactors. By the proper operation of controller segments 55, 59, 63, 64, 65, 84 and 85, the primary winding 32 may be energized for either direction of operation. If a load is to be hoisted, contact fingers 57 and 58 are bridged by controller segment 59, contact fingers 54 and 56 are bridged by controller segment 55, and conductor 2 is connected to the remaining phase of the primary winding 32 through contact finger 60, controller segment 85, conductor 61, controller segment 84, contact finger 62, to the primary 32.

The energization of the magnetizing coil 16 is also controlled directly by the manual controller 83. For the hoisting direction and the off position, contact fingers 51 and 52 are bridged by the controller segment 53, thus energizing magnetizing coil 16 from conductors 2 and 3 of the main supply. For the three lowering positions 'a'', 'b'' and 'c'', magnetizing coil 16 is energized from the secondary winding, namely, from conductor 41 through conductor 10, coil 16, rectifier 17, contact fingers 51 and 86, bridged by the controller segment 53, and resistor 46 to conductor 47. No further discussion of the operation of the modification shown in Fig. 2 is probably needed, since such operation will be apparent from the detailed discussion hereinbefore given of the sequence of operation of the modification shown in Fig. 1.

Applicant is, of course, aware that to those skilled in the art, particularly if they have had the benefit of the teachings of applicant's invention, other circuit arrangements than the circuit arrangements shown in the two modifications hereinbefore described may be devised. Consequently, applicant desires that his invention be limited only by the scope of the appended claims and the pertinent prior art.

I claim as my invention:

1. In a control system for an induction motor having a primary winding and a secondary winding, in combination, a source of alternating-current energy, means adapted to connect said source of energy to said primary winding, an adjustable time-limit device adapted to change the effective impedance of the secondary winding circuit from a given high value to a given relatively lower value in a definite time interval the time interval being determined by the adjustment of the time element device, and means, responsive to a characteristic of the current in the secondary winding, adapted to initiate the operation of said time-limit device.

2. In a control system for a motor of the alternating-current type having a primary winding and a secondary winding, in combination, a source of alternating current, means for connecting said primary winding to said source of current, a time-limit device adapted to change the effective impedance of the secondary winding circuit from a given high value to a relatively lower value in a definite time interval, and means responsive to a selected frequency of the current in the secondary winding adapted to initiate the operation of said time-limit device.

3. In a control system for a motor of the alternating-current type having a pair of windings, in combination, a source of energy, means for connecting said source of energy to one of the windings, an adjustable time-limit device adapted to vary an electrical characteristic of one winding circuit from a given high value to some relatively lower value in a definite time interval the time interval being determined by the adjustment of said time-limit device, and means, responsive to a certain current characteristic in the winding controlled by the time-limit device, adapted to initiate the operation of said time-limit device.

4. In a control system for an alternating-current motor having a primary winding and a secondary winding, in combination, a source of alternating-current energy, means for connecting the primary winding to the source of energy, resistor sections for the secondary winding, switching means adapted to shunt the resistor sections, adjustable time-limit means adapted to effect operation of said switching means a selected definite time interval after initiation of the operation of said time-limit means, and means responsive to a predetermined speed of the motor adapted to initiate the operation of said time-limit means, whereby operation of the switching means causes the motor speed to remain substantially at said predetermined speed.

5. In a system of control for an induction motor, having a primary winding and a secondary winding, in combination, a source of alternating-current energy, reversing switches adapted to connect the primary winding to the source of energy for operation of the motor either in a forward direction or in a reverse direction, a plurality of resistor sections connected in circuit relation with the secondary winding, a spring-closed contactor for shunting said resistor sections, electromagnetic means for opening said contactor disposed to be energized from the source of energy when the switch for forward motor operation is closed and disposed to be energized from the secondary winding when the switch for reverse motor operation is closed.

6. In a system of control for an induction motor having a primary winding and a secondary winding, in combination, a source of alternating-current energy, switching means for connecting the primary winding to the source of energy to operate the motor in one direction, switching means for connecting the primary winding to the source of energy to operate the motor in another direction, a plurality of impedances connected in circuit relation with the secondary winding, spring biased control switching means for shunting said impedances, electromagnetic means adapted to open said spring-biased switching means, and circuit connections cooperatively related with said switching means and arranged so that said electromagnetic means is energized from said source of energy when the first named switching means is closed and energized from the secondary winding when the second named switching means is closed.

7. In a control system for an induction motor, of the wound rotor type, having a primary winding and a secondary winding including a resistor section, in combination, a source of alternating-current energy, time-limit means of the electromagnetic type, means adapted to connect said primary winding of the motor for one direction of operation of the motor, and said time-limit means to the source of energy, means adapted to connect said primary winding of the motor for another direction of operation, and adapted to disconnect said time-limit means for energization from said source and connect said time-limit means for energization from said secondary winding whereby said time-limit means is adapted to become deenergized when the secondary winding has zero frequency of current induced therein, and means, operated by the deenergization of said time-limit means, adapted to shunt the resistor section in said secondary winding.

8. In a control system for a dynamo-electric machine having a stator and a rotor and adapted to operate either as a motor or as a generator depending on the characteristics of the load coupled to the rotor, in combination, a winding on the stator, a source of energy, means adapted to connect the stator winding to the source of energy, a winding on the rotor, a resistor in circuit with the winding on the rotor, and time-limit means, set in operation at the time said machine is changed from motor operation to generator operation, adapted to shunt said resistor connected in circuit with the winding on the rotor a definite time after such change from motor to generator operation.

9. In a control system for an induction motor, of the wound rotor type, in combination, a motor having a primary winding, connected to be energized from a source of alternating current energy of a certain frequency, and a secondary winding, a resistor section connected in circuit with the secondary winding, switching means adapted to shunt said resistor section, means adapted to be energized by the current in the secondary winding having a frequency above a certain relatively low frequency with reference to the frequency of the source of energy and adapted to hold said switching means open, and means operable a substantially definite interval of time after such relatively low current frequency in the secondary winding has been attained to shunt said resistor section.

10. In a system of control for a dynamo-electric machine adapted to operate as a generator or as a motor depending on the characteristics of the load connected to said machine, in combination, a winding, a source of energy, means adapted to connect said winding to said source of energy, a second winding inductively related to said first winding, a resistor in circuit relation with said second winding, and an electromagnetic switch, connected to be energized from said second winding and adapted to be deenergized at the instant of change of said machine from motor operation to generator operation, and constructed and arranged to shunt said resistor when deenergized.

11. In a control system for an induction motor, in combination, a source of alternating-current energy, a primary winding, a secondary winding, impedance means in circuit relation with said secondary winding, a spring biased switch biased to shunt said impedance means, and a solenoid connected to said secondary winding for operating said switch in opposition to said biasing effect, said solenoid being deenergized by synchronous operation of said motor whereby said impedance means are shunted when said motor is operated as a generator.

12. In a control system for an induction motor, in combination, a source of alternating-current energy, a primary winding, a secondary winding, impedance means in circuit relation with said secondary winding, a switch for shunting said impedance means, a solenoid connected to said secondary winding for operating said switch said solenoid being deenergized by synchronous operation of said motor, and time-limit means set in operation by the deenergization of said solenoid and adapted to shunt said impedance means a definite time interval after the deenergization of the solenoid.

13. In an electric system of control, in combination, an alternating-current dynamo-electric machine adapted to operate either as a motor or a generator, a secondary winding therefor, impedance means connected in circuit relation with said secondary winding, and adjustable time-limit means connected in circuit relation with said secondary winding and operable a selected time interval after said machine changes from motor operation to generator operation to shunt said impedance means.

WILLIAM R. WICKERHAM.